(12) United States Patent  
Bullerjahn et al.

(10) Patent No.: US 9,073,785 B2  
(45) Date of Patent: *__Jul. 7, 2015__

(54) METHOD FOR PRODUCING TERNESITE

(75) Inventors: Frank Bullerjahn, Leimen (DE); Dirk Schmitt, Leimen (DE); Mohsen Ben Haha, Heidelberg (DE)

(73) Assignee: HEIDELBERGCEMENT AG, Heidelberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/239,348

(22) PCT Filed: Jul. 16, 2012

(86) PCT No.: PCT/EP2012/002976

§ 371 (c)(1),  
(2), (4) Date: Apr. 29, 2014

(87) PCT Pub. No.: WO2013/023729

PCT Pub. Date: Feb. 21, 2013

(65) Prior Publication Data

US 2014/0230699 A1  Aug. 21, 2014

(30) Foreign Application Priority Data

Aug. 18, 2011 (EP) .................................. 11006757  
Oct. 26, 2011 (EP) .................................. 11008570  
Mar. 5, 2012 (EP) .................................. 12001488  
Mar. 26, 2012 (EP) .................................. 12002111  
Mar. 30, 2012 (EP) .................................. 12002342  
May 10, 2012 (EP) .................................. 12003718

(51) Int. Cl.  
*C04B 7/345* (2006.01)  
*C04B 7/32* (2006.01)  
(Continued)

(52) U.S. Cl.  
CPC ............... *C04B 7/3453* (2013.01); *C04B 28/04* (2013.01); *C04B 28/065* (2013.01); *C04B 28/08* (2013.01);  
(Continued)

(58) Field of Classification Search  
CPC .......... C04B 7/32; C04B 7/323; C04B 7/326; C04B 7/345; C04B 28/02; C04B 28/04; C04B 28/065; C04B 28/08; C04B 40/0039  
USPC .......................... 106/638, 692, 693, 695, 815  
See application file for complete search history.

(56) References Cited

U.S. PATENT DOCUMENTS 6,113,684 A * 9/2000 Kunbargi ................. 106/692  
6,406,534 B1  6/2002 Kunbargi  
(Continued)

FOREIGN PATENT DOCUMENTS

AT    393 381 B    10/1991  
CN    1479700 A    3/2004  
(Continued)

OTHER PUBLICATIONS

Belz et al., "Use of Fly Ash, Blast Furnace Slag, and Chemical Gysum for the Synthesis of Calcium Sulfoaluminate-Based Cements", Fly Ash, Silica Fume, Slag and Natural Pozzolans in Concrete. Proceedings International Conference, vol. 1, No. SP-153 (1995), pp. 513-530, XP001011491.

(Continued)

*Primary Examiner* — Anthony J Green  
(74) *Attorney, Agent, or Firm* — Paul D. Strain, Esq.; Strain & Strain PLLC

(57) ABSTRACT

The present invention relates to the production of ternesite clinkers containing 20 to 95% by weight $C_5S_2\$$ and less than 15% by weight $C_4A_3\$$, and to the use of ternesite as an additive to hydraulic and/or latent hydraulic and/or pozzolanic materials.

21 Claims, 11 Drawing Sheets

(51) Int. Cl.

| | |
|---|---|
| C04B 28/06 | (2006.01) |
| C04B 28/04 | (2006.01) |
| C04B 28/08 | (2006.01) |
| C04B 40/00 | (2006.01) |
| C04B 28/02 | (2006.01) |
| C04B 22/00 | (2006.01) |
| C04B 22/14 | (2006.01) |
| C04B 7/02 | (2006.01) |
| C04B 7/26 | (2006.01) |
| C04B 7/28 | (2006.01) |
| C04B 16/04 | (2006.01) |
| C04B 103/14 | (2006.01) |
| C04B 111/00 | (2006.01) |

(52) U.S. Cl.
CPC .............. C04B 7/323 (2013.01); C04B 7/326 (2013.01); C04B 7/345 (2013.01); C04B 40/0039 (2013.01); *C04B 2103/14* (2013.01); *C04B 2111/00017* (2013.01); *C04B 2111/00767* (2013.01); C04B 28/02 (2013.01); C04B 22/0093 (2013.01); C04B 22/14 (2013.01); C04B 7/02 (2013.01); C04B 7/26 (2013.01); C04B 7/28 (2013.01); C04B 16/04 (2013.01); C04B 28/021 (2013.01)

(56) References Cited

U.S. PATENT DOCUMENTS

| | | |
|---|---|---|
| 6,758,896 B2 | 7/2004 | Kunbargi |
| 7,150,786 B2 | 12/2006 | Kunbargi |
| 8,153,552 B2 | 4/2012 | Cau Dit Coumes et al. |
| 8,557,039 B2 | 10/2013 | Jacob et al. |
| 8,574,359 B2 | 11/2013 | Marchi et al. |
| 2002/0164485 A1 | 11/2002 | Martin |
| 2004/0101672 A1 | 5/2004 | Anton et al. |
| 2011/0308431 A1 | 12/2011 | Pasquier et al. |
| 2012/0085265 A1 | 4/2012 | Walenta et al. |
| 2013/0118384 A1 | 5/2013 | Barnes-Davin et al. |
| 2014/0230696 A1 | 8/2014 | Bullerjahn et al. |
| 2014/0230697 A1 | 8/2014 | Bullerjahn et al. |
| 2014/0238274 A1 | 8/2014 | Bullerjahn et al. |
| 2014/0261088 A1 | 9/2014 | Bullerjahn et al. |
| 2014/0283712 A1 | 9/2014 | Bullerjahn et al. |

FOREIGN PATENT DOCUMENTS

| | | |
|---|---|---|
| CN | 101952216 A | 1/2011 |
| DE | 21 22 710 A1 | 11/1971 |
| DE | 37 01 717 C1 | 4/1988 |
| DE | 196 44 654 A1 | 4/1998 |
| DE | 198 43 092 A1 | 11/1999 |
| DE | 600 29 770 T2 | 8/2007 |
| DE | 10 2005 054 180 B3 | 10/2007 |
| EP | 0 397 963 A1 | 11/1990 |
| EP | 0 838 443 A1 | 4/1998 |
| EP | 0 858 981 A1 | 8/1998 |
| EP | 0 959 053 A1 | 11/1999 |
| EP | 1 171 398 B1 | 8/2006 |
| EP | 2 159 202 A1 | 3/2010 |
| EP | 2 559 674 A1 | 2/2013 |
| FR | 2 901 270 A1 | 11/2007 |
| FR | 2 928 643 A1 | 9/2009 |
| FR | 2 946 978 A1 | 12/2010 |
| JP | 9-268037 A | 10/1997 |
| JP | 2001-130945 A | 5/2001 |
| WO | WO 98/18740 A1 | 5/1998 |
| WO | WO 2005/097700 A2 | 10/2005 |
| WO | WO 2012/055517 A1 | 5/2012 |
| WO | WO 2013/023727 A2 | 2/2013 |
| WO | WO 2013/023728 A2 | 2/2013 |
| WO | WO 2013/023730 A2 | 2/2013 |
| WO | WO 2013/023731 A2 | 2/2013 |
| WO | WO 2013/023732 A2 | 2/2013 |

OTHER PUBLICATIONS

Beretka et al., "The Influence of $C_4A_3S$ Content and W/S Ratio on the Performance of Calcium Sulfoaluminate-based Cements", Cement and Concrete Research, vol. 26, No. 11 (1996), pp. 1673-1681.
European Search Report, Appl. No. 11006757.6, Jan. 25, 2012, 9 pgs.
European Search Report, Appl. No. 12001488.1, Jun. 27, 2012, 13 pgs.
European Search Report, Appl. No. 12002111.8, Jun. 27, 2012, 15 pgs.
European Search Report, Appl. No. 12002342.9, Jul. 25, 2012, 13 pgs.
European Search Report, Appl. No. 12003718.9, Oct. 11, 2012, 14 pgs.
International Search Report, PCT/EP2012/002974, Feb. 8, 2013, 3 pgs.
International Search Report, PCT/EP2012/002975, Feb. 8, 2013, 4 pgs.
International Search Report, PCT/EP2012/002976, Feb. 8, 2013, 4 pgs.
International Search Report, PCT/EP2012/002977, Feb. 8, 2013, 3 pgs.
International Search Report, PCT/EP2012/002978, Feb. 8, 2013, 2 pgs.
International Search Report, PCT/EP2012/002979, Feb. 8, 2013, 4 pgs.
Irran et al., "Ternesit, $Ca_5(SiO_4)_2SO_4$, a new Mineral from the Ettringer Bellerberg/Eifel, Germany", Mineralogy and Petrology, vol. 60, No. 1-2 (1997), pp. 121-132.
Kurdowski et al., "Mineral Composition of Build-Up in Cement Kiln Preheater", Journal of Thermal Analysis and Calorimetry, vol. 55 (1999), pp. 1021-1029.
Marroccoli et al., "Synthesis of Calcium Sulfoaluminate Cements From $Al_2O_3$-Rich By-products From Aluminium Manufacture", $2^{nd}$ International Conference on Sustainable Construction Materials and Technologies Jun. 28-30, 2010, University Politecnica Delle Marche, Ancona, Italy, No. 2 (2010), pp. 1-9, XP002645670.
Sherman et al., "Long-term behaviour of hydraulic binders based on calcium sulfoaluminate and calcium sulfosilicate", Cement & Concrete Research, vol. 25, No. 1 (1995), pp. 113-126.
Stark, "Zernent and Kalk: Der Baustoff als Werkstoff", Jan. 1, 2000. Birkhauser. Basel, XP002679558, ISBN: 3-7643-6216-2. p. 61.
Belz et al., "Synthesis of Special Cements from Mixtures Containing Fluidized Bed Combustion Waste, Calcium Carbonate and Various Sources of Alumina", 28th Meeting of the Italian Section of The Combustion Institute (2005), pp. I-4-1-I-4-6.
Belz et al., "Fluidized Bed Combustion Waste as a Raw Mix Component for the Manufacture of Calcium Sulphoaluminate Cements", 29th Meeting of the Italian Section of The Combustion Institute (2006), pp. IX4.1-IX4.5.
English translation of International Preliminary Report on Patentability, PCT/EP2012/002974, Feb. 20, 2014.
English translation of International Preliminary Report on Patentability, PCT/EP2012/002975, Feb. 20, 2014.
English translation of International Preliminary Report on Patentability, PCT/EP2012/002976, Feb. 20, 2014.
English translation of International Preliminary Report on Patentability, PCT/EP2012/002977, Feb. 27, 2014.
English translation of International Preliminary Report on Patentability, PCT/EP2012/002978, Feb. 20, 2014.
English translation of International Preliminary Report on Patentability, PCT/EP2012/002979, Feb. 27, 2014.
Jewell et al., "The Fabrication of Value Added Cement Products from Circulating Fluidized Bed Combustion Ash", 2007 World of Coal Ash (WOCA), May 7-10, 2007, Northern Kentucky, USA, 11 pgs.
Kapralik et al., "Phase Changes in the System $CaO-Al_2O_3-SiO_2-Fe_2O_3-MgO-CaSO_4-K_2SO_4$ in Ar up to 1300 °C. referred to Sulphoaluminate Cement Clinker", Br. Ceram. Trans. J., vol. 85 (1986), pp. 131-136.

(56) References Cited

OTHER PUBLICATIONS

Sahu et al., "Phase compatibility in the system CaO—SiO2—Al2O3—Fe2O3—SO3 referred to sulphoaluminate belite cement clinker", Cement and Concrete Research, vol. 23 (1993), pp. 1331-1339.
Bullerjahn, U.S. PTO Office Action, U.S. Appl. No. 14/239,319, Jun. 26, 2014, 18 pgs.
Bullerjahn, U.S. PTO Office Action, U.S. Appl. No. 14/239,339, Jun. 27, 2014, 16 pgs.
Bullerjahn, U.S. PTO Office Action, U.S. Appl. No. 14/238,872, Jul. 21, 2014, 14 pgs.
Beretka et al. "Synthesis and Properties of Low Energy Cements based on C4A3S", 9th International Congress on the Chemistry of Cement (1992), pp. 195-200.
Beretka et al., "Utilisation of industrial wastes and by-products for the synthesis of special cements", Resources, Conservation and Recycling, vol. 9 (1993), pp. 179-190.
Calos et al., Structure of Calcium Aluminate Sulfate Ca4Al6O16S, Journal of Solid State Chemistry, vol. 119 (1995), pp. 1-7.
Schmidt et al. "Quantification of Calcium Sulpho-Aluminate Cement by Rietveld Analysis", Materials Science Forum, vols. 321-324 (2000), pp. 1022-1027.
Bullerjahn, U.S. PTO Notice of Allowance, U.S. Appl. No. 14/238,872, filed Dec. 16, 2014, 14 pgs.
Bullerjahn, U.S. PTO Notice of Allowance, U.S. Appl. No. 14/239,319, filed Dec. 29, 2014, 13 pgs.
Bullerjahn, U.S. PTO Notice of Allowance, U.S. Appl. No. 14/239,339, filed Jan. 12, 2015, 13 pgs.
Japanese Office Action, Application No. 2014-525336, Mar. 3, 2015, 4 pgs.
Odler, Special Inorganic Cements:, (2000), pp. 65, 66, 78, ISBN: 0-419-22790-3, https://books.google.co.jp/books?id=p6YTKgk8mBgC&pg=PA66&dg=C4A3&f=false.
Makhmudova et al., "Synthesis and Properties of Sulphoferrite Calcium Clinkers and Low Temperature Cements on their Basis", Journal of the University of Chemical Technology and Metallurgy, vol. 46, No. 2 (2011), pp. 151-154.
"CaO-A12O3—SO3—SiO2", P051045:10946, Mar. 11, 2015, pp. 95-98.
Li et al., "Microwave sintering of sulphoaluminate cement with utility wastes", Cement and Concrete Research, vol. 31, No. 9 (2001), pp. 1257-1261.
Chinese Office Action and English translation thereof, Appl. No. 201280040095.9, Mar. 19, 2015, 16 pgs.
Bullerjahn, U.S. PTO Office Action, U.S. Appl. No. 14/238,947, filed Mar. 25, 2015, 21 pgs.
Bullerjahn, U.S. PTO Office Action, U.S. Appl. No. 14/238,976, filed Apr. 16, 2015, 22 pgs.
Chinese Search Report and English translation thereof, Appl. No. 201280040006.0, Apr. 28, 2015, 4 pgs.
Bullerjahn, U.S. PTO Notice of Allowance, U.S. Appl. No. 14/239,319, filed May 8, 2015, 11 pgs.
Bullerjahn, U.S. PTO Notice of Allowance, U.S. Appl. No. 14/239,339, filed May 8, 2015, 12 pgs.
Bullerjahn, U.S. PTO Notice of Allowance, U.S. Appl. No. 14/238,872, filed May 8, 2015, 12 pgs.

* cited by examiner

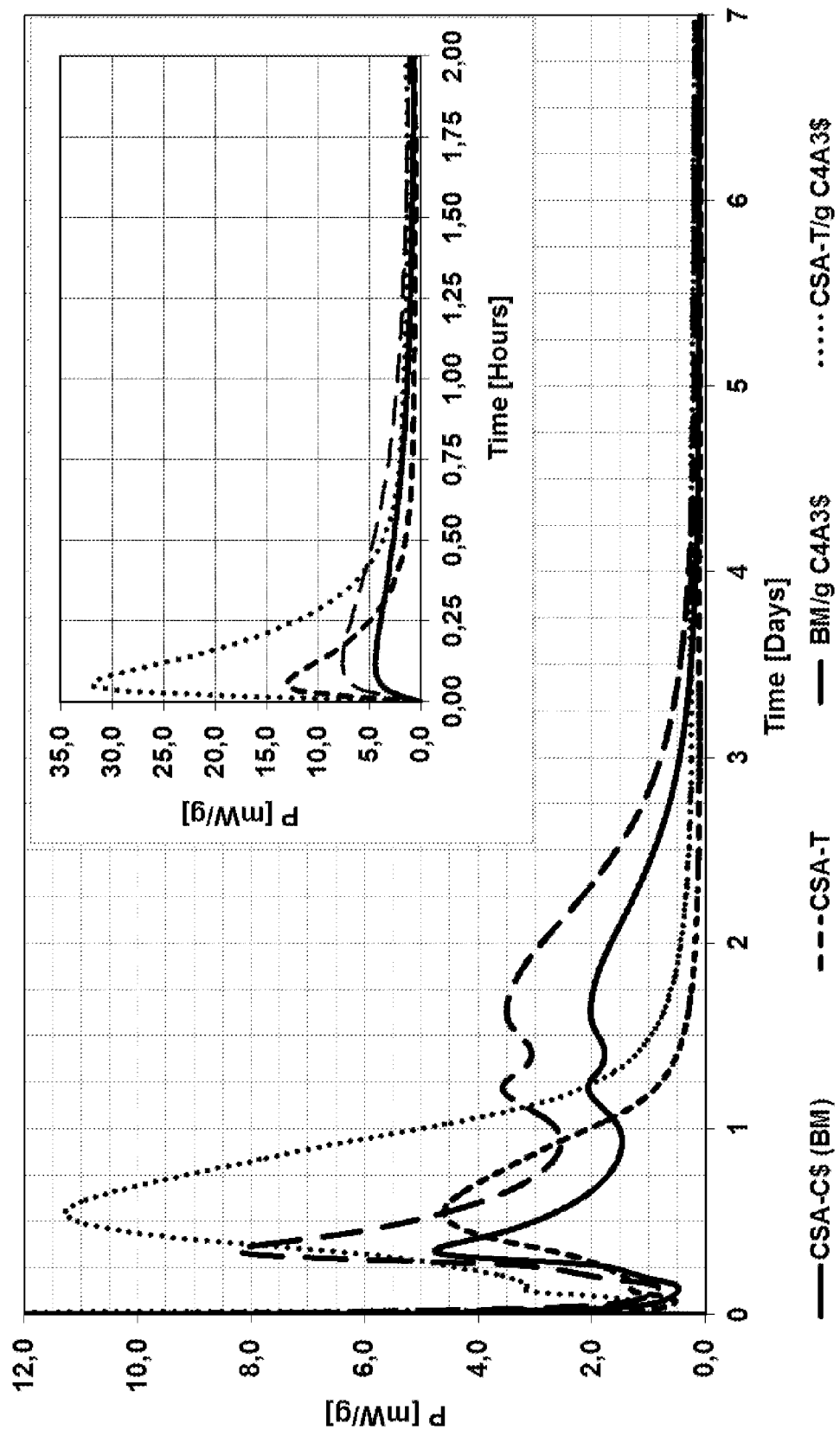
FIG. 1a: Heat flow of CSA-C$ and CSA-T hardened cement pastes

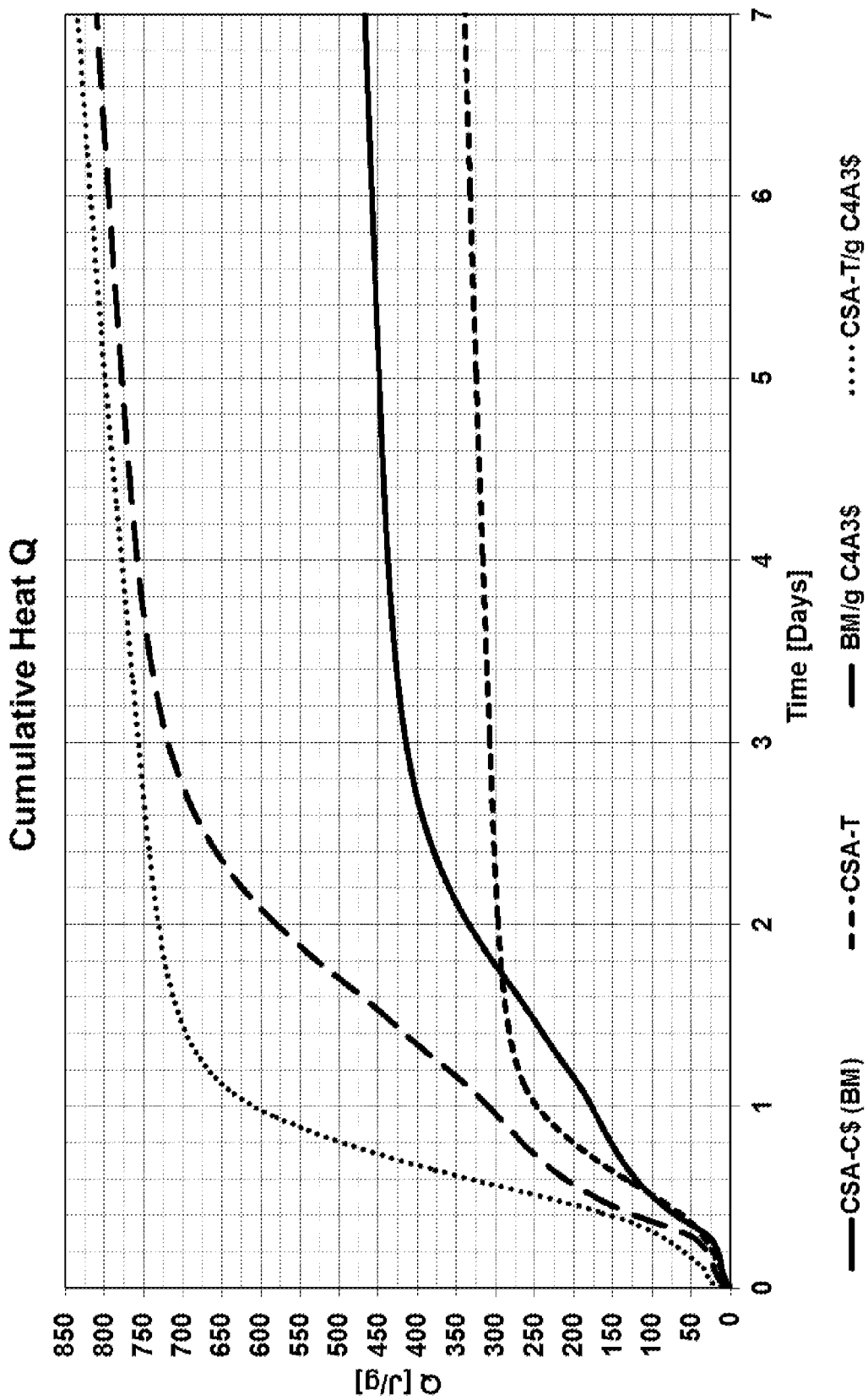
FIG. 1b: Cumulative heat flow of CSA-C$ and CSA-T hardened cement pastes

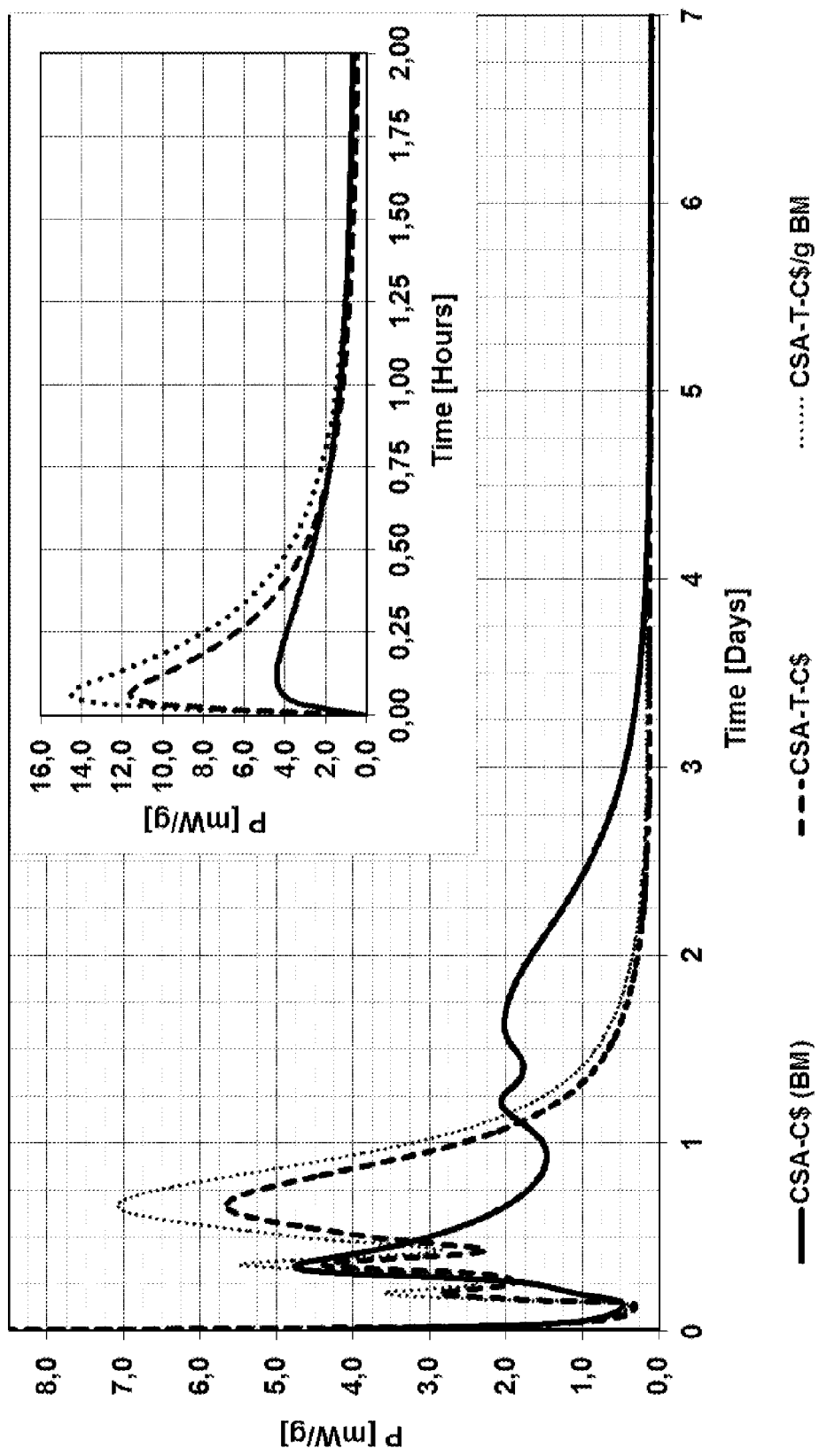
FIG. 2a: Heat flow of CSA-C$ and CSA-T hardened cement pastes

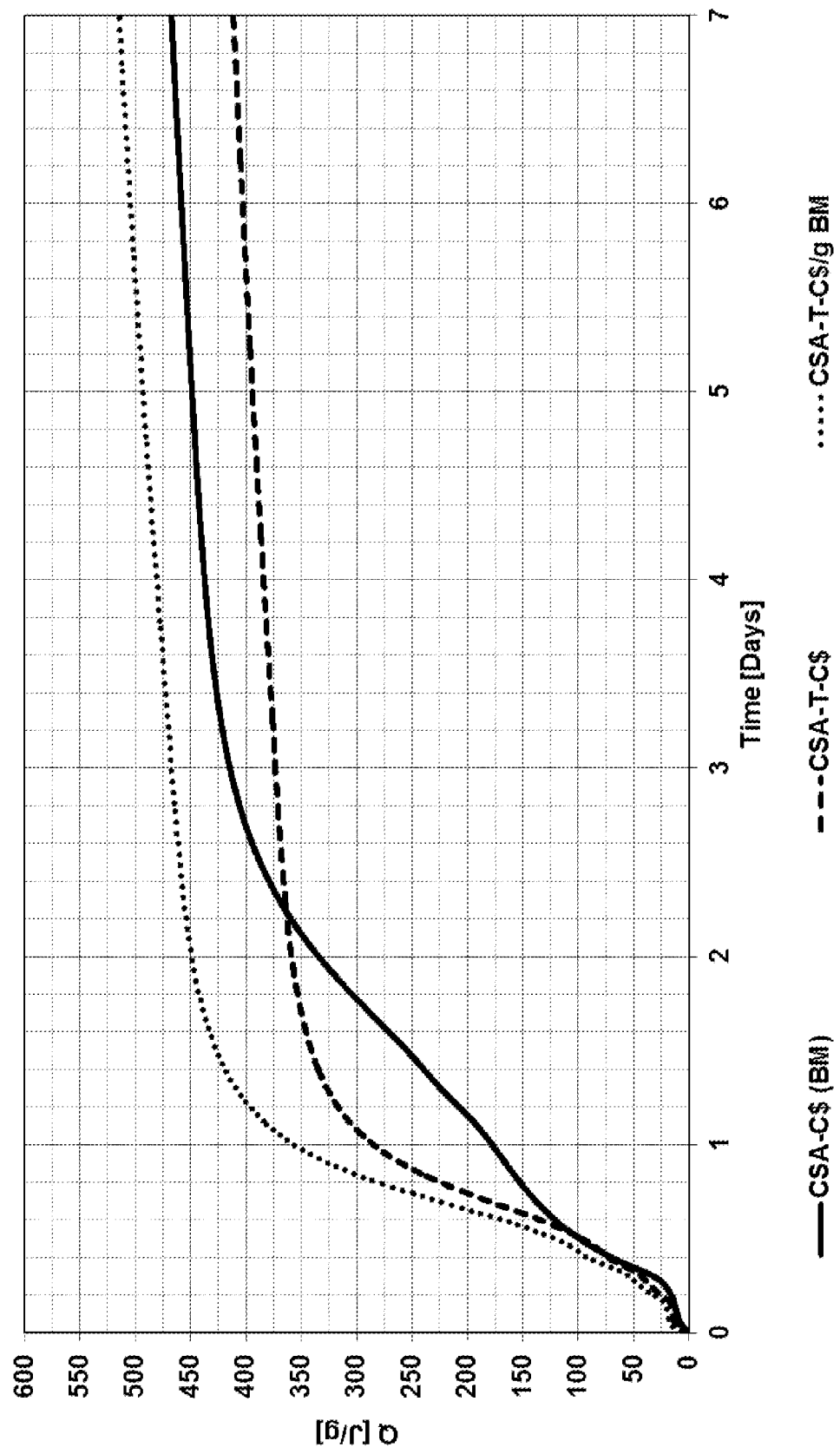
FIG. 2b: Cumulative heat flow of CSA-C$ and CSA-T hardened cement pastes

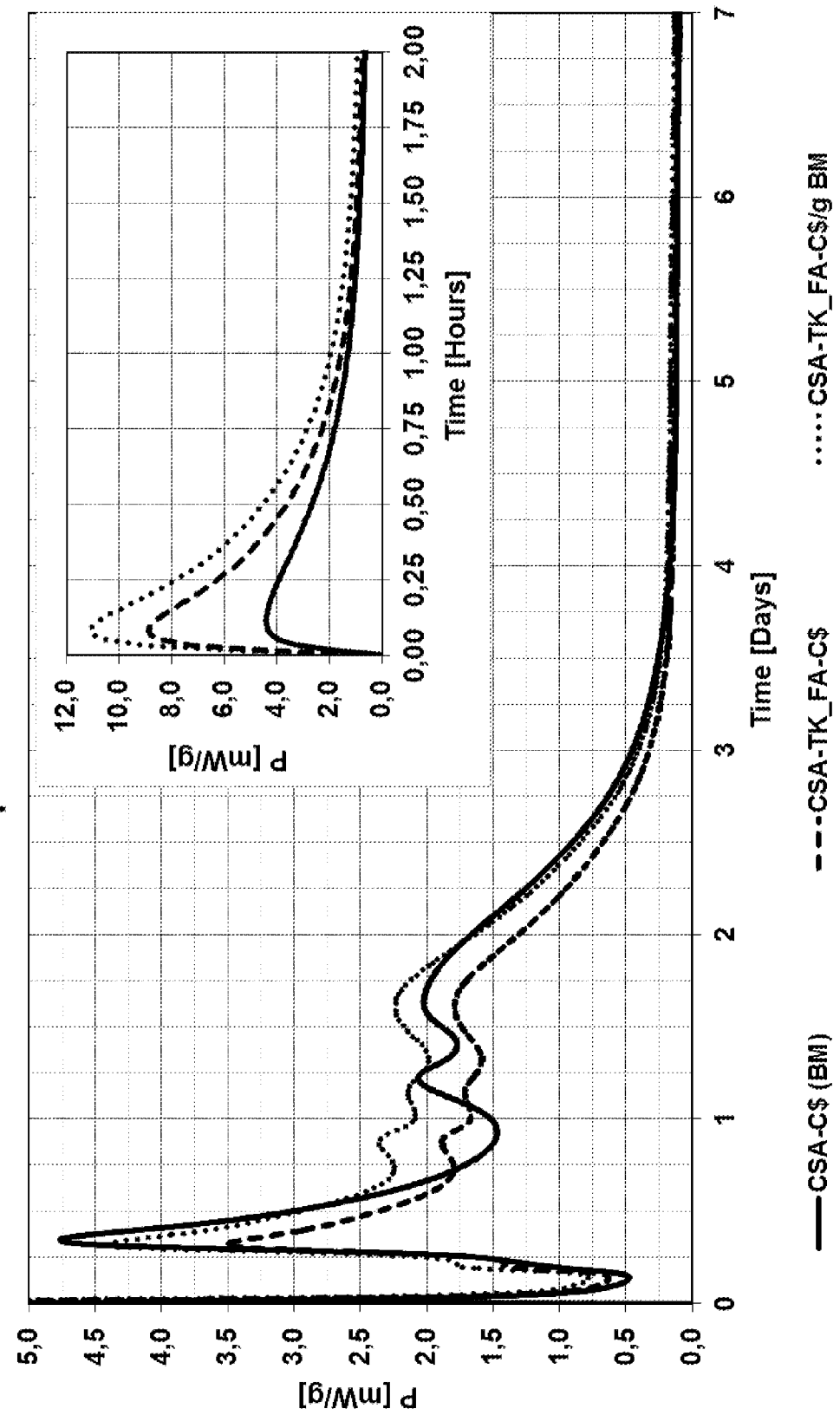
FIG. 3a: Heat flow of CSA-C$ and CSA-TK_FA-C$ hardened cement pastes

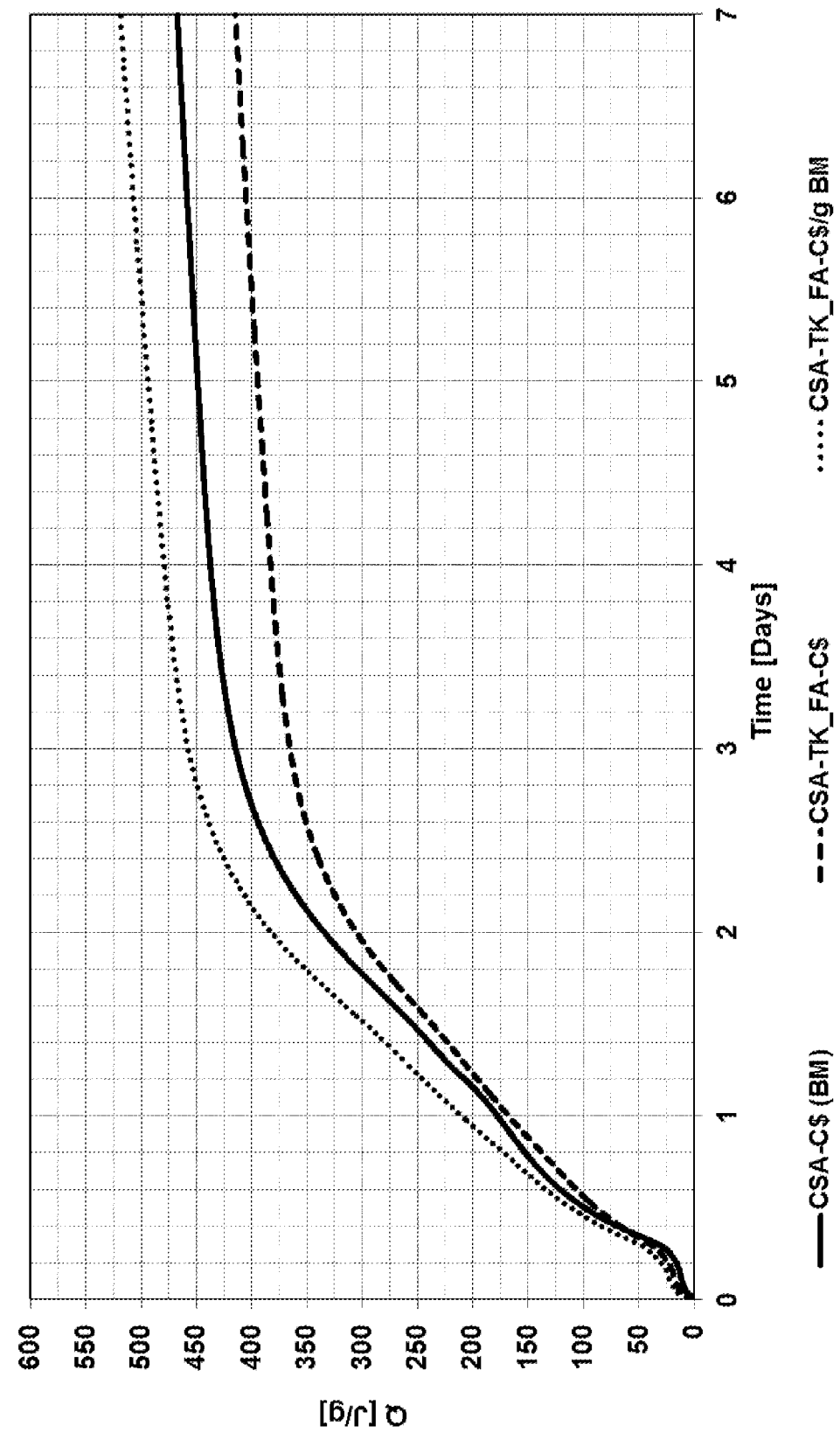
FIG.3b: Cumulative heat flow of CSA-C$ and CSA-TK_FA-C$ hardened cement pastes

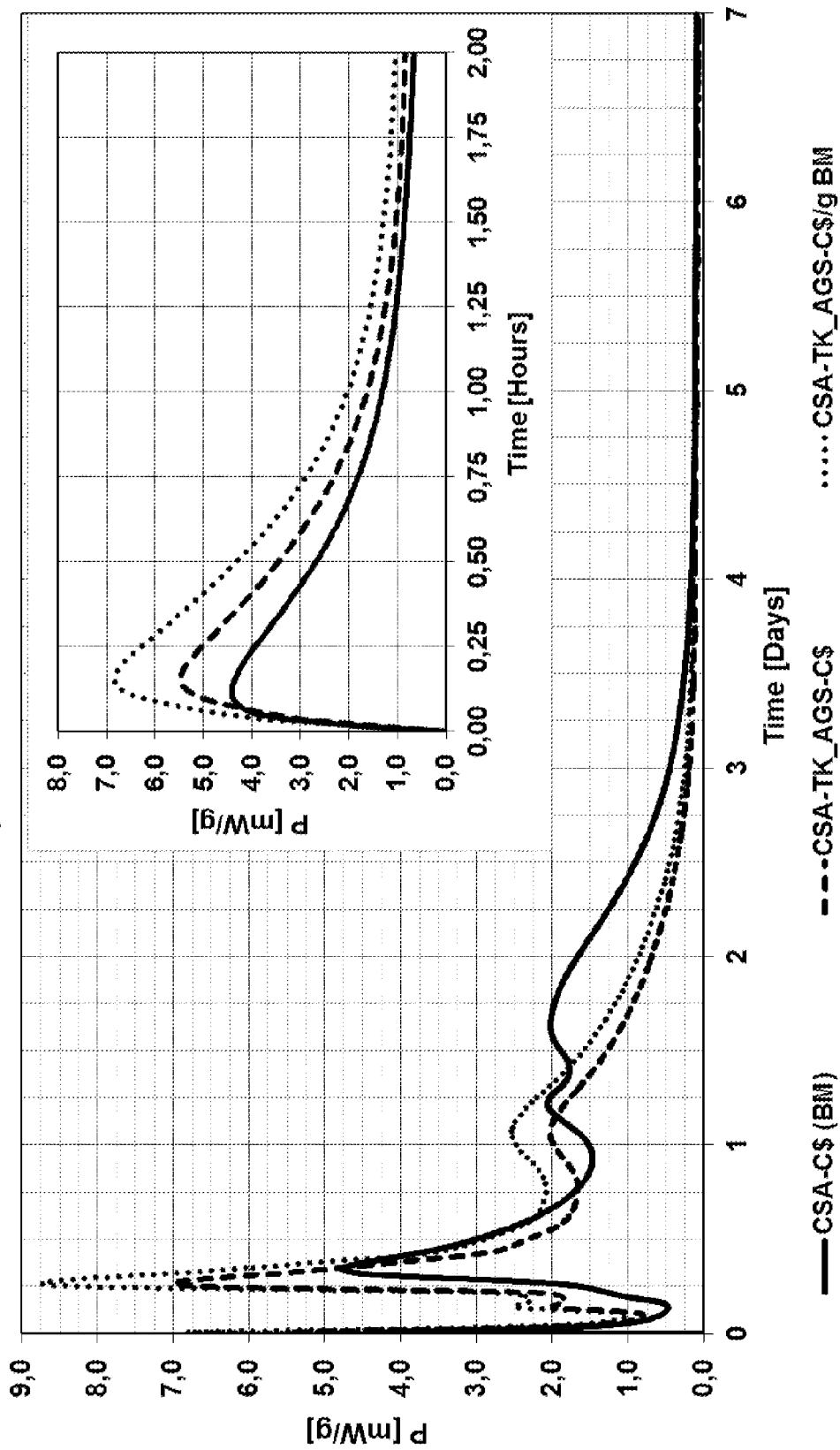
FIG. 4a: Heat flow of CSA-C$ and CSA-TK_AGS-C$ hardened cement pastes

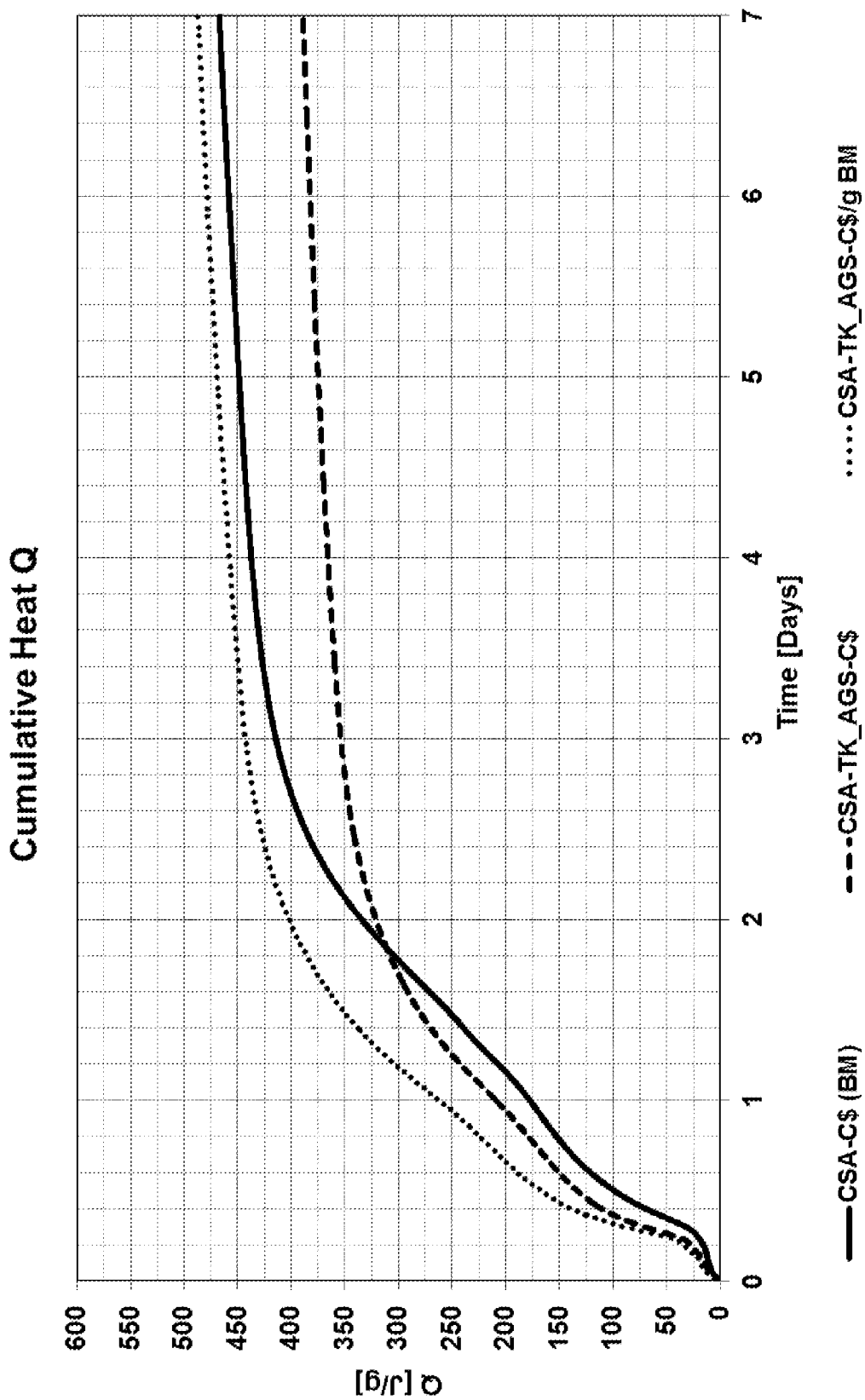
FIG. 4b: Cumulative heat flow of CSA-C$ and CSA-TK_AGS-C$ hardened cement pastes

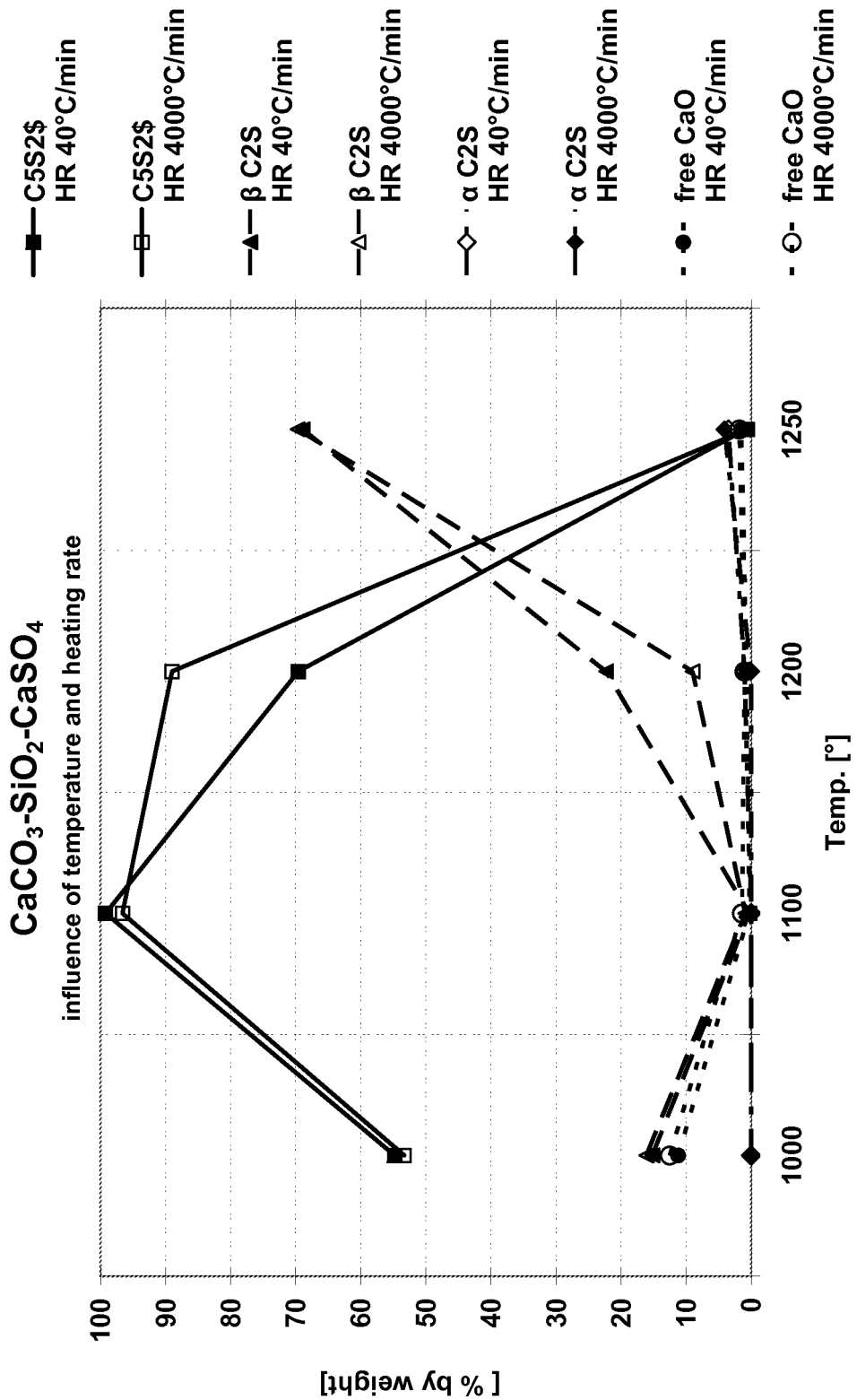
FIG. 5: Quantity of the $C_5S_2\$$ phase in the $CaCO_3-SiO_2-CaSO_4$ system

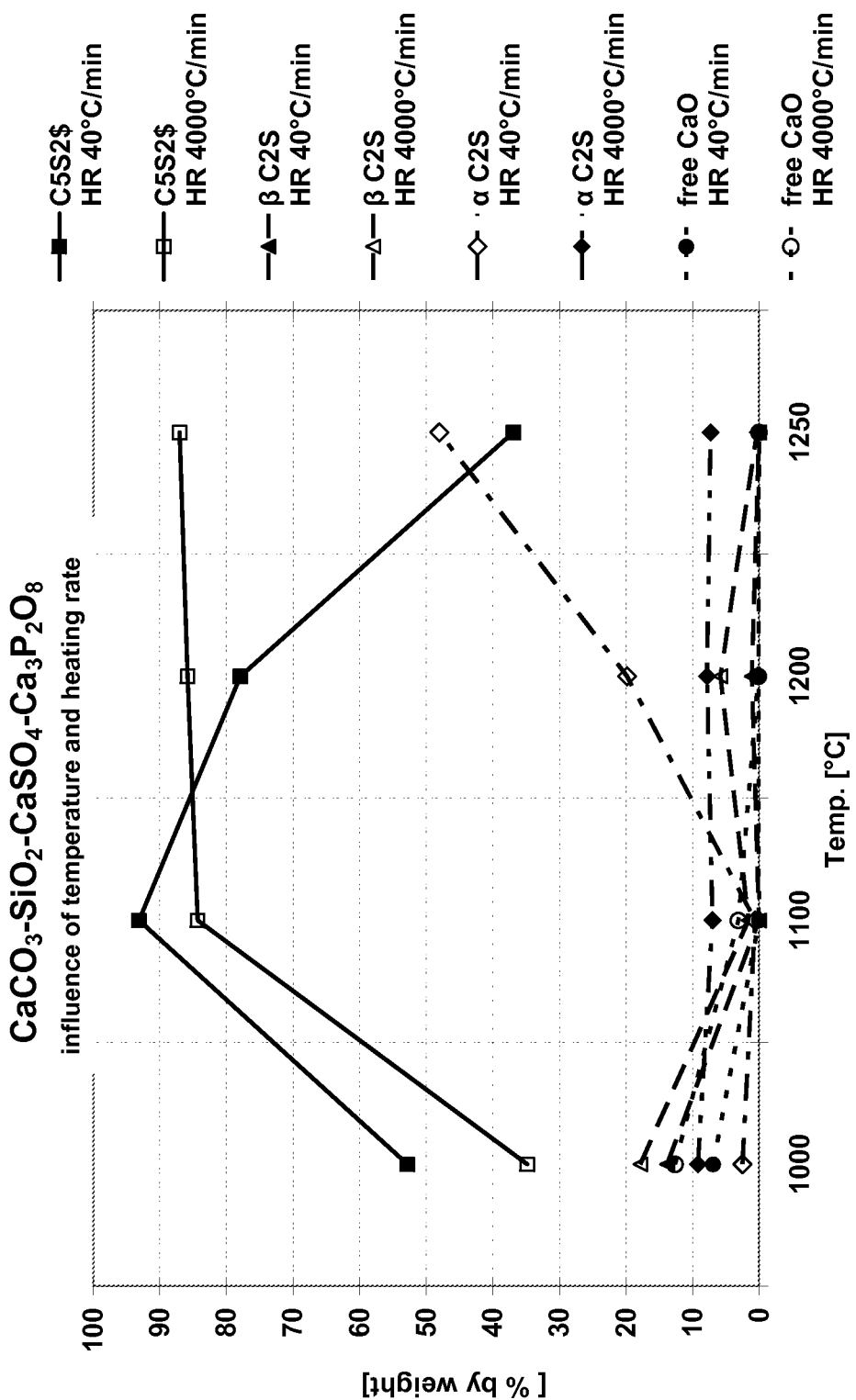
FIG. 6: Quantity of the $C_5S_2\$$ phase in the $CaO\text{-}SiO_2\text{-}CaSO_4\text{-}Ca_3P_2O_8$ system

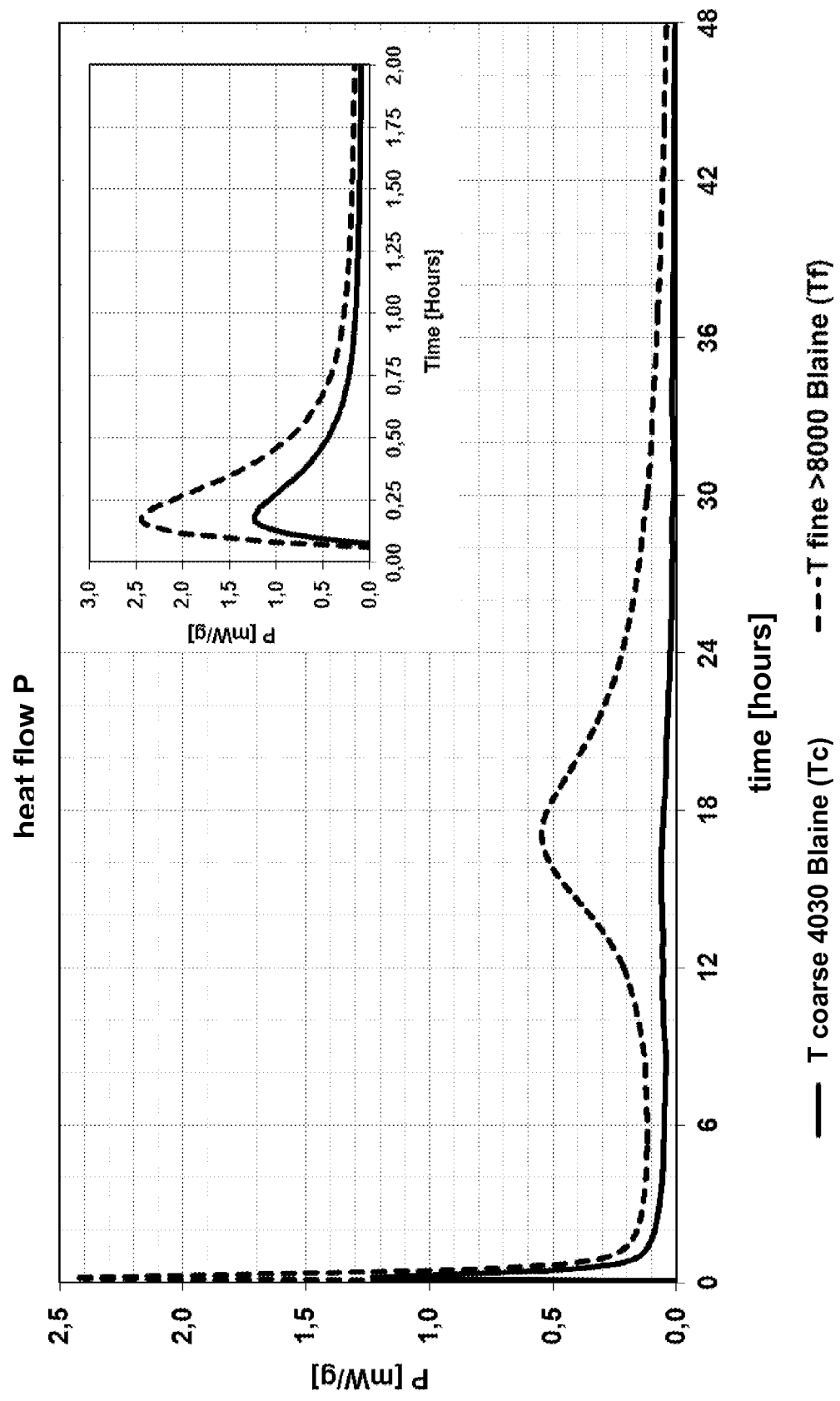
FIG. 7: Heat flow of the ground ternesite clinker

METHOD FOR PRODUCING TERNESITE

CROSS-REFERENCE TO RELATED PATENT APPLICATIONS

This application is a National Stage of International Application No. PCT/EP2012/002976, filed Jul. 16, 2012, which is based upon and claims the benefit of priority from prior European Patent Applications No. 11006757.6, filed Aug. 18, 2011, Ser. No. 11/008,570.1, filed Oct. 26, 2011, Ser. No. 12/001,488.1, filed Mar. 5, 2012, Ser. No. 12/002,111.8, filed Mar. 26, 2012, Ser. No. 12/002,342.9, filed Mar. 30, 2012, and No. 12003718.9, filed May 10, 2012, the entire contents of all of which are incorporated herein by reference in their entirety.

The present invention relates to producing ternesite, which is useful as an additive, for example to calcium sulfoaluminate(ferrite)(belite) clinker (CSA(F)(B)), cement, and binder.

Cement production accounts for a considerable portion of the global production of $CO_2$. Over the last few years, the worldwide growing demand for cement, notably in developing countries, as well as rising costs for raw materials, energy and $CO_2$ certificates have resulted in an increasing reduction of the clinker factor, for example by adding limestone powders, fly ash and granulated blast furnace slag as clinker replacement materials. This use of byproducts and waste products from other industries as well as the development of alternative binders are increasingly becoming the focus of attention in politics, science and business.

Around the world, enormous amounts of materials are incurred as part of thermal waste disposal/energy generation, steel production, noble metal extraction and the like, which hereinafter will be referred to as industrial byproducts. Depending on the quality/composition/field of application, some or all of these can be reused in various processes and products, for example as correcting agents for the clinker production for Portland cement (OPC), as additives for concrete, and as aggregates for asphalt and concrete, and the like.

However, due to various factors, for example the lack of uniformity (chemism and mineralogy) and the content of harmful substances (organic chemistry, heavy metals, and the like), the use of industrial byproducts entails some problems. Among other things, a decreasing reactivity/quality of OPC clinkers or insufficient volume stability of cements can cause large quantities of such materials to be disposed of at great expense every year or used as waste dump materials and landfill materials. Difficulties can also occur with the disposal of such materials, for example leaching processes may contaminate surrounding areas and water systems/groundwater. The use/treatment of industrial byproducts thus constitutes a major challenge and a problem that has yet to be resolved. In the future, the most efficient and sustainable use of resources will be indispensable and have relevance around the world.

In addition to substituting clinker in cement and raw materials in the raw meal mixture, attempts have also been made to find other hydraulic-setting binders. These include calcium sulfoaluminate cements and cements containing belite as the primary component.

The following abbreviations, which are common in the cement industry, will be used: H—$H_2O$, C—CaO, A-$Al_2O_3$, F—$Fe_2O_3$, M-MgO, S—$SiO_2$ and \$-$SO_3$. So as to simplify the further description, compounds are generally indicated in the pure forms thereof, without explicitly stating series of solid solutions/substitution by foreign ions and the like, as they are customary in technical and industrial materials. As any person skilled in the art will understand, the composition of the phases mentioned by name in the present invention may vary, depending on the chemism of the raw meal and the type of production, due to the substitution with various foreign ions, such compounds likewise being covered by the scope of the present invention and comprised by the designation of the pure phases/compounds.

EP 1 171 398 B1 (DE 600 29 779 T2) describes the sintering of specific raw materials at 900 to 1200° C. so as to produce special clinkers in the kiln which have high concentrations of crystal X={(C, K, N, M)$_4$(A, F, Mn, P, T, S)$_3$(Cl, \$)} and crystal Y={$C_2S$)$_3$($CS$)$_3$Ca(f, cl)$_2$} and/or crystal Z={$C_5S_2$\$}. These clinkers are mixed with hydraulic cement or cement of the Portland type to produce finished cement compositions.

Surprisingly, it was found that the $C_5S_2$\$ phase (ternesite, also referred to as sulfospurrite or sulfate spurrite) constitutes a significantly reactive phase in systems with aluminum components. The literature (see, for example, "Synthesis of Calcium Sulfoaluminate Cements From $Al_2O_3$-Rich By-products from Aluminium Manufacture", Milena Marroccoli et al., The second international conference on sustainable construction materials and technologies 2010, "Synthesis of Special Cements from Mixtures Containing Fluidized Bed Combustion Waste, Calcium Carbonate and Various Sources of Alumina", Belz et al, 28th Meeting of the Italian Section of The Combustion Institute 2005, "Fluidized Bed Combustion Waste as a Raw Mix Component for the Manufacture of Calcium Sulphoaluminate Cements", Belz G et al, 29th Meeting of the Italian Section of The Combustion Institute, 2006 and "The Fabrication of Value Added Cement Products from Circulating Fluidized Bed Combustion Ash", Jewell R. B et al, World of Coal Ash (WOCA) Covington, Ky., USA, 2007) describes the $C_5S_2$\$ phase as being less reactive or inert and undesirable. In addition, methods for avoiding this "undesirable phase" are highlighted on a regular basis. It was surprising to find during our experiments that a significant amount of this $C_5S_2$\$ phase reacts already within the first few days of hydration and significantly influences the phase composition of the hydrated samples.

Ternesite is particularly suitable as an additive to hydraulic binders, wherein the aluminum required for setting can come either from the binder or in part or entirely from an added aluminum component. Ternesite can also prompt the reaction of latent hydraulic and/or pozzolanic materials.

Aluminum components are considered to be substances having high solubility and/or high reactivity, such as soluble alkali/alkaline earth aluminates and aluminum salts (for example $Na_2Al_2O_4$, $K_2Al_2O_4$, aluminum nitrate, -acetate, -chloride, -formiate, -sulfate, or the like), reactive and/or amorphous aluminum hydroxide, aluminum oxide hydroxides, synthetic and natural pozzolanes (for example metakaolin), Portland cement having high $C_3A$ and/or high $C_4AF$ contents, aluminous cement, calcium sulfoaluminate cement and the like, or combinations thereof. However, the aluminum component alone does not necessarily exhibit a hydraulic or latent hydraulic or pozzolanic characteristic.

Producing binders from ternesite and latent hydraulic and/or pozzolanic materials paves the way for entirely new markets and application options and allows a significant reduction of the $CO_2$ production.

A need therefore exists for efficient, cost-effective and environmentally sound methods for producing ternesite, and thus the object is to find such methods.

This object is solved by a method for producing ternesite clinker, in which ternesite clinker is obtained by sintering a raw meal mixture containing at least sources for CaO, $SiO_2$ and $SO_3$, wherein the sintering temperature is adjusted such that the ternesite clinker contains at least 20% by weight $C_5S_2$\$, relative to the total weight of the clinker. The ternesite clinker can be used in the ground state as a self-contained binder. Ternesite clinker is preferably used in combination with other hydraulic and/or latent hydraulic and/or pozzolanic materials, such as Portland cement, fly ash, granulated blast furnace slag, annealed clays, synthetic glass and the like. Before or after grinding, the ternesite clinker can thus be mixed with other substances to form a binder.

Within the context of the present invention, clinker shall mean a sinter product which is obtained by burning a raw material mixture at an elevated temperature and which contains at least one hydraulically reactive phase. Cement denotes a clinker that is ground with or without adding further components. Binder or binder mixture denotes a mixture which contains a cement and typically, but not necessarily, additional finely ground components and hardens hydraulically, and which is used after adding water, optionally admixtures and aggregate.

A clinker may already contain all the necessary or desired phases and be used directly as a binder after being ground to form cement. According to the invention, the composition of the binder is preferably obtained by mixing two or more clinkers and/or cements, wherein the mixing takes place already before (or during) grinding and/or in the ground state and/or during production of the binder. Unless a time is specifically indicated for mixing, the following descriptions concern binders (and cements) which are not restricted in this regard.

Unless indicated otherwise, the term "reactive" denotes hydraulic reactivity.

Phases such as $C_5S_2\$$, for example, are primarily indicated stoichiometrically, however the exact composition may deviate/vary. Moreover, various foreign ions from the group of the halogens, nonmetals, alkali and alkaline earth metals as well as materials from the transition metals, metalloids and metals can be added to the crystal structure of the phase. These are all suitable for the clinker according to the invention. Preferably, for example, phosphate, fluoride, boron, nitrate or chloride as well as sodium and potassium are added to the structure of $C_5S_2\$$, whereby the same is stabilized (for example at elevated temperatures>1200° C.) and/or is formed more quickly. Preferably phosphate and/or iron can be added to the $C_4A_3\$$ phase. The addition of foreign ions can result in a higher formation rate of the phase in the hot zone, which in turn may potentially decrease the required residence time and/or result in a quantitative increase of the phase. Substances which act as flux and/or lower the temperature that is required to form a melt and/or such which are favorable in terms of the formation of the clinker compound, such as by solid solution crystal formation and/or phase stabilization, for example, are collectively referred to hereinafter as mineralizers.

The term $Al_2O_3(Fe_2O_3)$ as well as the description $C_4(A_xF_{1-x})_3\$$ for the clinker phase denote that part of the aluminum can be replaced with iron, which is to say x is a number from 0.1 to 1.0. Typically, aluminum containing small amounts of iron admixtures is primarily present, however within the context of the invention it is also possible to use considerable quantities of iron, including as much as a predominant content of iron.

Proof of the incorporation of iron into the $C_4A_3\$$ phase is the quantitative decrease of iron-rich phases (for example $Fe_3O_4$, $C_2F$ and $C_4AF$), the increase of the $C_4A_3\$$ or $C_4(A_xFe_{(1-x)})_3\$$ phase, as well as the increase in peak intensities and in the lattice parameter c (Å) [crystal system: orthorhombic] from 9.1610 [PDF number: 01-085-2210, tetracalcium hexaaluminate sulfate(VI)—$Ca_4(Al_6O_{12})(SO_4)$, ICSD Collection Code: 080361, Calculated from ICSD using POWD-12++, (1997), structure: Calos, N. J., Kennard, C. H. L., Whittaker, A. K., Davis, R. L., J. Solid State Chem., 119, 1, (1995)] to 9.1784 [PDF number: 00-051-0162, calcium aluminum iron oxide sulfate—$Ca_4((Al_{0.95}Fe_{0.05}))_6O_{12}(SO_4)$, ICSD Collection Code:—, primary reference: Schmidt, R., Pöllmann, H., Martin-Luther-Univ., Halle, Germany., ICDD Grant-in-Aid, (1999)] to values greater than 9.2000. A potential solid solution crystal formation can also be determined by determining the occupancy factors in a Rietveld refinement due to under-occupancies or mixed occupancies of individual atomic positions. Another purely qualitative indicator is the change of color of the clinkers, which in some instances is significant. The color of the clinkers changes, for example, from chestnut/ocher brown to green-brown all the way to a light gray hue.

The targeted production of ternesite, or a clinker or cement containing ternesite as at least one of the main components, has the advantage that ternesite or this clinker can be produced in one operation in a temperature range of typically 900 to 1200° C., and preferably 1050 to 1150° C. These low burning temperatures as compared to those used in the production of clinkers containing ye'elimite as the primary phase lead to the further advantage that deliberately increased magnesium/periclase contents (>2% by weight) can be adjusted in the clinker. Because of the low burning temperature, periclase may be present in a reactive form and contribute to the development of strength/hydration. However, depending on the raw material mixture, higher burning temperatures may be used as well, if high contents of ternesite are formed, with 20 to 100% of the clinker being preferred.

$C_5S_2\$$ can be produced by sintering raw materials that supply sufficient amounts of CaO, $SiO_2$ and $SO_3$. Pure or substantially pure raw materials, such as calcium carbonate or calcium oxide, quartz powder or microsilica, and calcium sulfate, are suitable for this purpose. In addition, a variety of natural as well as industrial materials, which include, for example, but are not limited to, limestone, bauxite, clay/claystone, calcined clays (for example metakaolin), basalts, peridotites, dunites, ignimbrites, carbonatites, ashes/slags/granulated blast furnace slags of high and low quality (mineralogy/glass content, reactivity, and the like), various waste dump materials, red and brown muds, natural sulfate carriers, desulfurization slags, phosphogypsum, gypsum from flue gas desulfurization, titanogypsum, fluorogypsum, and the like, can be used in suitable combinations as the raw material. In addition, substances/substance groups that have not been specifically listed are covered by the scope of protection if they satisfy the minimum chemical requirements as potential raw materials. The raw materials may be pretreated, but do not have to be.

Ternesite also occurs as a mineral, however no deposits are known from which it would be possible to extract it in sufficient quantity or purity, and while the use of "natural" ternesite is possible, it is not economical in practice. Production according to the invention by the sintering of suitable raw materials is preferred.

The raw materials for producing the ternesite clinker according to the invention are ground to customary degrees of fineness in the known manner. Degrees of fineness of 2000 to 10000 $cm^2/g$, preferably in the range from 3000 to 6000 $cm^2/g$, and more preferred from 4000 to 5000 $cm^2/g$ are suited particularly well. The degree of grinding fineness will primarily depend on the type and composition of the raw material that is used, the burning process (temperature, residence time in the sintering zone, and the like) and the desired properties of the binder as well as the technical possibilities that are available.

If the production is to yield as pure $C_5S_2\$$ as possible, raw materials that are selected will be those which contain no, or only few, additional constituents, in addition to the sources for CaO, $SiO_2$ and $SO_3$. The reaction of calcium carbonate with quartz powder and calcium sulfate in the temperature range of 900 to 1200° C., and preferably 1050 to 1150° C., yields $C_5S_2\$$ having a purity of >99%.

However, it is preferred to use the highest possible amount of cost-effective and environmentally compatible raw materials for producing $C_5S_2\$$. Environmentally compatible in the context of the present invention shall mean the lowest possible energy expenditure and/or the conservation of natural raw materials and/or high-quality waste products and byproducts.

A reaction of approximately 25% of the fly ash FA1 (see examples) with approximately 45% limestone K1, approximately 8% quartz (Merck, analytical grade) and approximately 20% MicroA (natural anhydrite) resulted in a clinker having a $C_5S_2\$$ content of >70%, and purities of >80% were achieved with the reaction of ~8% metakaolin, ~58% K1, ~23% MicroA and ~10% $SiO_2$.

The reaction of these raw materials is likewise preferably carried out in the temperature range of 900 to 1200° C., and preferably of 1050 to 1150° C. Contrary to the known sintering of the same raw materials with the goal of forming $C_4A_3\$$ at a minimum temperature of 1200° C., here substantially ternesite is formed.

Starting materials which in advance were treated in the autoclave and/or starting materials having (very) small grain and crystallite sizes are possible raw material sources. Very small grain and crystallite sizes are those ranging from 0.01 to 0.1 μm and small grain sizes are those ranging from 0.1 to 2 μm. Starting materials having (very) small grain and crystallite sizes and/or raw material mixtures thereof can be produced by, for example, but not limited to, a spraying, sol-gel, glycerin-nitrate and/or polymer precursor method. This procedure has the advantage that the raw meal is reacted very quickly into the desired clinker even at low temperatures (for example 900 to 1000° C.) and that, depending on the adjusted heating rate and due to small grain and crystallite sizes, hydraulically highly reactive clinker phases can be generated.

Depending on the raw material composition, notably due to the presence of mineralizers, higher temperatures of up to 1300° C., for example, may also be suitable, for example if relevant amounts of phosphorus are present, as is the case when using phosphogypsum. Contrary to the known methods/clinkers, however the invention focuses on the formation of ternesite, and the sintering temperature is thus optimized for forming the same. At these temperatures, an increased amount of reactive polymorphs of dicalcium silicate can develop, in addition to ternesite. In contrast, in the prior art the sintering temperature was optimized for the formation of $C_4A_3\$$, and ternesite should not be formed as far as possible.

In contrast, according to the invention the temperature is selected such that as much ternesite as possible is formed and, to the extent that the raw materials contain sources for $Al_2O_3$ or $Fe_2O_3$, the content of $C_4(A_xF_{(1-x)})_3\$$ is limited to less than 20%, and preferably to less than 15%. While it would also be possible to use clinkers containing more $C_4(A_xF_{(1-x)})_3\$$, a higher content thereof will come at the expense of ternesite, and the corresponding higher sintering temperature can also adversely affect the reactivity of ternesite.

The temperature range of 900° C. to 1300° C., and preferably of 1050° C. to 1150° C., should be maintained for a period of 10 minutes to 180 minutes, preferably 25 minutes to 120 minutes, and still more preferably 30 minutes to 60 minutes. For the purpose of forming desired further phases during cooling, the clinker can pass through the range of 900° C. to 750° C. for a period of 5 minutes to 120 minutes, and preferably 10 minutes to 60 minutes. Finally, possibly also without delayed cooling in the range of 900° C. to 750° C., the clinker is rapidly cooled down in the known manner, so that additional phase changes are prevented.

The reactivity of the clinker can be adjusted or optimized in accordance with the respective requirements of the binder, for example by increasing the degree of fineness and/or contents of α $C_2S$. This can likewise be achieved by adding mineralizers to the raw meal, wherein a portion, and as much as the predominant portion, of the dicalcium silicate is present as an α polymorph of $C_2S$ and/or in the form of solid solution crystals or doped "α" $C_2S$, for example in the presence of $P_2O_5$ as calcium phosphate silicate [$Ca_2SiO_4 \cdot 0.05Ca_3(PO_4)_2$]. This favors or triggers the formation of at least one melt phase (for example a calcium-silicate melt phase in the system $CaO$—$SiO_2$—$CaSO_4$—±mineralizer, or also in the system $CaO$—$Al_2O_3(Fe_2O_3)$—$SiO_2$—$CaSO_4$—±mineralizer).

Surprisingly, it has also been found that the heating rate and the use of mineralizers (for example $Ca_3P_2O_8$, $CaF_2$, $K_2PO_4$, $Na_2PO_4$, $Na_2CO_3$, $K_2CO_3$, $FeCl_3$, $MgCl_2$, $Na_2[B_4O_5(OH)_4] \cdot 8H_2O$, $BaSO_4$, and the like) significantly influence the composition of the clinker and the amounts and contents of the reactive phases. A high heating rate of, for example, more than 1000° C./min, preferably more than 2000° C./min, and still more preferably more than 3500° C./min, stabilizes $C_5S_2\$$ even at higher temperatures, as does the use of mineralizers. A high heating rate is achieved by setting the kiln to the desired target temperature, which is to say the raw meal was sintered directly at the corresponding temperature. In addition to ternesite, polymorphs of α $C_2S$ and solid solutions of α $C_2S$ and of the mineralizer form at lower heating rates.

The formation of a melt phase can be deliberately controlled by the selection of the heating rate, the maximum burning temperature, the cooling rate and/or the addition of mineralizers.

According to the invention, the clinker containing $C_5S_2\$$ as the main component, or cement obtained therefrom by grinding without additives, includes the following components in the indicated contents:

$C_5S_2\$$ 20 to 100% by weight,
preferably 30 to 95% by weight, and still more preferably 40 to 90% by weight (α, β) $C_2S$ 0 to 80% by weight,
preferably 5 to 70% by weight, and still more preferably 10 to 60% by weight $C_4(A_xF_{(1-x)})_3\$$ 0 to <15% by weight,
preferably 3 to 12% by weight, and still more preferably 5 to 10% by weight $C_2(A_yF_{(1-y)})$ 0 to 30% by weight,
preferably 5 to 20% by weight, and still more preferably 8 to 15% by weight reactive aluminates 0 to 20% by weight,
preferably 1 to 15% by weight, and still more preferably 3 to 10% by weight periclase (M) 0 to 25% by weight,
preferably 1 to 15% by weight, and still more preferably 2 to 10% by weight secondary phases 0 to 30% by weight,
preferably 3 to 20% by weight, and still more preferably 5 to 10% by weight relative to the total amount of clinker/cement, with the contents of the phases amounting to 100%.

The designation (α, β) $C_2S$ denotes polymorphs of $C_2S$ and mixtures thereof, the reactive α polymorphs (for example α, α'L, α'H) being preferred. Preferably, at least 5% by weight α polymorphs of $C_2S$ are present because these advantageously contribute to high early strength.

By adding mineralizers to the raw meal, a portion, and as much as the predominant portion, of the dicalcium silicates may be present in the form of solid solution crystals as doped "α" $C_2S$, for example in the presence of $P_2O_5$ as calcium phosphate silicate $[Ca_2SiO_4.0.05Ca_3(PO_4)_2]$. Such compounds are likewise covered by the group of reactive $αC_2S$ polymorphs and are within the scope of the present invention. The mineralizer that may be present can also be added to the structure of $C_5S_2$\$, for example, depending on the added quantity.

In the $C_4(A_xF_{(1-x)})_3$\$ phase, x ranges between 0.1 and 1, and preferably between 0.8 and 0.95. In the $C_2(A_yF_{(1-y)})$ phase, y ranges between 0.2 and 0.8, and preferably between 0.4 and 0.6.

Reactive aluminates shall be understood to include, for example, but not be limited to, $C_3A$, $CA$ and $C_{12}A_7$.

Secondary phases may include, for example, but are not limited to, alkali/alkaline earth sulfates, quartzes, spinels, olivines, pyroxenes, substances from the melilith and merwinite groups, apatites, ellestadites, silicocarnotite, free lime, spurrite, quartz and/or an X-ray amorphous phase content/a glassy phase, in a content of 0% by weight to 30% by weight, preferably 2% by weight to 20% by weight, and still more preferably 5% by weight to 15% by weight. The content of free lime in the clinker is less than 5% by weight, preferably less than 2% by weight, and still more preferably less than 1% by weight. In a preferred embodiment, the ternesite clinker contains 1 to 10% by weight, preferably 2 to 8% by weight, and still more preferably 3 to 5% by weight of at least one X-ray amorphous phase/a glassy phase.

A ternesite clinker having, among other things, an X-ray amorphous phase content/a glassy phase was previously not described and also cannot be found in the patent EP 1 171 398 B1.

The contents of the primary oxides of a separately produced clinker containing $C_5S_2$\$ as the primary phase comprise the following ranges:
CaO 40 to 70% by weight, preferably 45 to 60% by weight, and still more preferably 50 to 55% by weight
$SiO_2$ 5 to 30% by weight, preferably 10 to 25% by weight, and still more preferably 15 to 23% by weight
$SO_3$ 3 to 30% by weight, preferably 5 to 26% by weight, and still more preferably 8 to 22% by weight
$Σ(Al_2O_3+Fe_2O_3)$ 0 to 40% by weight, preferably 5 to 30% by weight, and still more preferably 8 to 20% by weight
MgO 0 to 25% by weight, preferably 2 to 15% by weight, and still more preferably 5 to 10% by weight
relative to the total quantity of clinker/cement, with the amount of the contents adding up to 100%.

A targeted production of a $C_5S_2$\$ clinker, the stabilization of $C_5S_2$\$ at elevated temperatures, the potentially increased formation rate of α $C_2S$, solid solution crystals of dicalcium silicate as well as the formation of at least one melt phase in the clinker, and the use of ternesite clinker as an additive in combination with reactive, aluminum-rich systems so as to increase the early strength of binders have not been previously described. This is a completely novel approach to increasing the early strength and/or durability of hydraulic and latent hydraulic binder systems.

For producing cement or binder mixtures, ternesite produced according to the invention or ternesite-rich clinker is ground, either separately from or together with one or more or all of the additional binder components that are to be ground, in the known manner, with or without additional sulfate carriers, to the customary degrees of cement fineness (according to Blaine) between 2000 and 10000 $cm^2/g$, preferably between 3000 and 6000 $cm^2/g$, and still more preferably between 4000 and 5000 $cm^2/g$.

Notably alkali and/or alkaline earth sulfates are suitable sulfate carriers, preferably in the form of gypsum and/or hemihydrate and/or anhydrite, but also magnesium sulfate, sodium sulfate and potassium sulfate. Because ternesite also supplies sulfate over the course of the reaction, a binder that can be processed well can also be obtained with a smaller amount of a further sulfate carrier or without the same.

The clinker with the primary $C_5S_2$\$ phase can be used as a self-contained binder if it has a suitable composition, which includes, for example, but is not limited to, increased contents of reactive aluminates and ferrates. However, it is more advantageous to combine the same, for example, with Portland, calcium sulfoaluminate(ferrite)(belite), calcium aluminate clinker, cement or binder to obtain binders having optimized compositions.

Hydraulically reactive materials such as calcium aluminate, calcium aluminate cement, calcium sulfoaluminate, calcium sulfoaluminate cement, geopolymer cement and/or latent hydraulic materials such as burned oil shale, gehlenite glass or combinations thereof can be added to the binder. The mixing with hydraulic or latent hydraulic reactive components is not required to achieve useful hydraulic reactivity; it is rather by combining the ternesite ground into cement with a non-hydraulically reactive aluminum source that it exhibits the desired hydraulic reactivity.

The binder preferably also contains admixtures and/or additives, and optionally further hydraulically active components. The additives can be latent hydraulic, pozzolanic and/or not hydraulically active (for example ground limestone/dolomite, precipitated $CaCO_3$, $Mg(OH)_2$, $Ca(OH)_2$, aluminum hydroxide [for example amorphous $Al(OH)_3$], soluble alkali aluminates [for example $Na_2Al_2O_4$], silica fume) components.

The cement or the binder mixture preferably also contains one or more setting accelerators and/or hardening accelerators as an admixture, which are preferably selected among components having available aluminum, or such which in contact with water liberate aluminum, for example in the form of $Al(OH)_4$ or amorphous $Al(OH)_3$ gel, which include, for example, but are not limited to, soluble alkali aluminates [for example $Na_2Al_2O_4$, $K_2Al_2O_4$, and the like], and aluminum hydroxide (for example amorphous $Al(OH)_3$). Moreover, the cement or the binder mixture may contain one or more setting accelerators and/or hardening accelerators as an admixture, likewise in combination with the aforementioned components having available aluminum, preferably selected from the lithium salts and hydroxides, other alkali salts and hydroxides, and alkali silicates.

Additives, such as alkali aluminates and alkali salts, silicates and hydroxides, for example, which additionally increase the pH value of the solution and consequently the reactivity of $C_5S_2$\$, are particularly preferred and can be metered in an amount ranging from 0.1 to 10% by weight, preferably from 0.5 to 5% by weight, and still more preferably from 1 to 2% by weight.

It is further preferred if plasticizers and/or water reducing admixtures and/or retarders are present, preferably based on lignin sulfonates, sulfonated naphthalene, melamine or phenolformaldehyde condensate, or based on acrylic acid-acrylamide mixtures or polycarboxylate ethers, or based on phosphated polycondensates, phosphated alkylcarboxylic acid and salts thereof, (hydroxy)carboxylic acids and carboxylates, borax, boric acid and borates, oxalates, sulfanilic acid, aminocarboxylic acids, salicylic acid and acetylsalicylic acid, and dialdhydes.

The clinker containing $C_5S_2\$$, notably if the clinker contains few other phases, can be ground with very low energy expenditure, so that the same can be adjusted to greater degrees of fineness of the $C_5S_2\$$-containing clinker by separate grinding or pre-grinding, for example if higher reactivity (faster reaction/consumption) of $C_5S_2\$$ is desired. If this is required for a special application, the ground product can have a grain size distribution with $d_{50}$ less than 20 μm and $d_{90}$ less than 100 μm, or $d_{50}$ less than 5 μm and $d_{90}$ less than 20 μm, or $d_{50}$ less than 0.1 μm and $d_{90}$ less than 2 μm.

Intensive grinding of the $C_5S_2\$$-containing clinker may cause some (often 3 to 20%) up to almost all (>90%) of the phase content of the clinker, for example $C_5S_2\$$, to be present as an X-ray amorphous phase. This is accompanied by a significant increase in reactivity and allows novel, highly reactive binder systems to be formulated.

During processing of the cement according to the invention, or of a binder comprising the same, a water/binder value of 0.2 to 2 is suitable, preferably of 0.3 to 0.8, and still more preferably of 0.45 to 0.72.

Individual components or component mixtures can be used to produce the binder, depending on the quality and composition of the available raw materials or clinkers.

Another advantage of the cement obtained from the ternesite (clinker) produced according to the invention, or of the binder mixture produced therefrom, is the formation of different phases during hydration (for example ettringite [$AF_t$], monophases [$AF_m$], metal-metal hydroxysalts [LDH], and the like), which add various heavy metals as well as other harmful substances (chloride, for example, or the like) to the structures thereof and can thus permanently bind them.

The invention will be described based on the following examples, without being limited to the embodiments that are described in detail. Unless stated otherwise or unless the context automatically stipulates to the contrary, the percentage information relates to the weight, in case of doubt to the total weight of the mixture.

The invention also relates to all possible combinations of preferred embodiments, provided they do not mutually exclude each other. The expressions "approximately" or "about" in conjunction with numerical data shall mean that values that are higher or lower by at least 10%, or values that are higher or lower by 5%, and in any case values that are higher or lower by 1%, shall be included.

BRIEF DESCRIPTION OF THE DRAWINGS

FIGS. 1a and 1b show the specific and cumulative heat flow of cement pastes CSA-C\$ and CSA-T;

FIGS. 2a and 2b show the specific and cumulative heat flow of cement pastes CSA-C\$ and CSA-T;

FIGS. 3a and 3b show the specific and cumulative heat flow of cement pastes CSA-C\$ and CSA-TK_FA-C\$;

FIGS. 4a and 4b show the specific and cumulative heat flow of cement pastes CSA-C\$ and CSA-TK_AGS-C\$;

FIG. 5 shows the influence of temperature and heating rate on the quantity of $C_5S_2\$$ phase in the CaO—$SiO_2$—$CaSO_4$ system;

FIG. 6 shows the influence of temperature and heating rate on the quantity of $C_5S_2\$$ phase in the CaO—$SiO_2$—$CaSO_4$—$Ca_3P_2O_8$ system;

FIG. 7 shows the specific heat flow of a ground ternesite clinker.

EXAMPLES

Table 2 lists the raw materials that were used to carry out the examples described hereafter, characterized based on the oxidic main constituents and the degrees of grinding fineness thereof. The loss of weight after annealing at 1050° C. is also indicated in the table. Table 3 shows the mineralogical phase composition of the industrial byproducts used.

TABLE 2

Elemental composition of the raw materials used (RFA)

| | | Raw material | | | | |
|---|---|---|---|---|---|---|
| RFA | Unit | Limestone K1 | Fly ash FA1 | Sulfate carrier Sample MicroA | Al corr. Al(OH)$_3$ | Metakaolin MK |
| GV 1050° C. | % | 43.09 | 0.82 | 4.64 | 34.64 | 1.91 |
| $SiO_2$ | % | 1.53 | 28.50 | 4.17 | 0.00 | 48.00 |
| $Al_2O_3$ | % | 0.35 | 12.50 | 1.36 | 65.36 | 41.60 |
| $TiO_2$ | % | 0.03 | 1.05 | 0.04 | 0.00 | |
| MnO | % | 0.01 | 0.18 | 0.00 | 0.00 | |
| $Fe_2O_3$ | % | 0.19 | 5.18 | 0.37 | 0.00 | 1.80 |
| CaO | % | 54.50 | 37.40 | 37.40 | 0.00 | 5.70 |
| MgO | % | 0.22 | 4.81 | 1.82 | 0.00 | 0.10 |
| $K_2O$ | % | 0.04 | 0.28 | 0.28 | 0.00 | 0.95 |
| $Na_2O$ | % | 0.00 | 0.07 | 0.06 | 0.00 | |
| $SO_3$ | % | 0.01 | 7.71 | 49.80 | 0.00 | |
| $P_2O_5$ | % | 0.01 | 1.27 | 0.00 | 0.00 | |
| Total | | 99.98 | 99.77 | 99.94 | 100.00 | 100.06 |
| Amorphous | % | / | 38.0 | / | / | >95 |
| Density | g/cm$^3$ | 2.64 | 2.82 | | | 2.54 |
| Grinding fineness acc. to Blaine | cm$^2$/g | 3350 | 4380 | | | |

TABLE 3

Mineralogical phase composition of the fly ash FA1 used (QXRD according to Rietveld)

| Mineral | Unit | |
|---|---|---|
| Quartz | % by weight | 11.5 |
| Cristobalite | % by weight | 0.4 |
| Uncombined lime | % by weight | 9.3 |
| Periclase | % by weight | 2.8 |
| Anhydrite | % by weight | 10.4 |
| Gehlenite | % by weight | 6.3 |
| Merwinite | % by weight | 4.9 |
| Maghemite | % by weight | 1.2 |
| Hematite | % by weight | 0.9 |
| Ye'elimite | % by weight | 3.1 |
| $C_2S$ | % by weight | 8.1 |
| $C_4AF$ | % by weight | 3.1 |
| Amorphous | % by weight | 38.0 |

Example 1

$T_{pur}$

A stoichiometric mixture of $CaCO_3$ [Merck, analytical grade], $CaSO_4$ [Merck, analytical grade] and quartz powder

[Merck, analytical grade] was burned for 1 hour at 1100° C., then rapidly cooled, ground, and again burned for 1 hour at 1100° C. and rapidly cooled.

Example 2

$TK_{FA}$

The raw mixture consisted of 45% by weight limestone (K1)+27% by weight FA1, 20% by weight MicroA and 8% by weight quartz powder (Merck, analytical grade). The raw meal was sintered at 1100° C. and after sintering completed a cooling program for annealing, in which the temperature was lowered from 1100° C. to 850° C. over approximately 35 minutes. The clinker was then cooled rapidly by exposure to air.

Example 3

$TK_{AGS}$

The raw mixture consisted of 58% by weight K1+8% by weight MK, 24% by weight MicroA and 10% by weight quartz powder (Merck, analytical grade). The raw meal completed the same program as in Example 2.

Example 4

Various binders were mixed from commercial CSA cement (for composition refer to Table 6) and the three ternesite grades from Examples 1 to 3 as well as MicroA. Table 4 lists the compositions of the ternesites, and table 5 lists the mixing ratios with the cement; FIGS. 1 to 4 indicate the heat flow and the cumulative heat flow of the mixtures when mixed with water with a w/b of 0.7. Table 7 shows the mineralogy of the cements according to Example 4 (QXRD according to Rietveld) and thermo gravimetric data (chemically bound water) of the cements and of the hardened cement pastes produced therefrom, standardized to 100% paste; w/c 0.7.

TABLE 4

Chemical (calculated) and mineralogical compositions of the clinkers from Examples 1 to 3

|  | $T_{pur}$ | $TK_{FA}$ | $TK_{AGS}$ |
|---|---|---|---|
| Oxides |  |  |  |
| $SiO_2$ | 25.00% | 21.30% | 22.16% |
| $Al_2O_3$ | — | 4.75% | 4.94% |
| $TiO_2$ | — | 0.38% | 0.04% |
| MnO | — | 0.07% | 0.01% |
| $Fe_2O_3$ | — | 1.96% | 0.45% |
| CaO | 58.34% | 53.20% | 55.34% |
| MgO | — | 2.23% | 0.77% |
| $K_2O$ | — | 0.19% | 0.22% |
| $Na_2O$ | — | 0.04% | 0.02% |
| $SO_3$ | 16.66% | 15.44% | 16.06% |
| $P_2O_5$ | — | 0.44% | 0.01% |
| Phases |  |  |  |
| Anhydrite | 0.4 | 0.3 | 0.2 |
| $C_3A$ (cub) | — | 2.2 | — |
| $C_3A$ (orth) | — | 1.2 | 0.4 |
| $C_2S$ a'H | — | 2.7 | 1.4 |
| $C_2S$ beta | — | 5.7 | 3.2 |
| $C_2S$ gamma | — | 1.1 | 0.4 |
| $\Sigma C_2S$ | — | 9.5 | 5.0 |
| Ternesite | 99.2 | 74.9 | 85.5 |
| Uncombined lime | <0.1 | 0.3 | 0.3 |
| Periclase | — | 1.2 | 0.5 |
| $C_4A_3S$ | — | 9.3 | 7.0 |
| Augite | — | 1.2 | 1.1 |
| Quartz | 0.4 | — | — |
| Ratios |  |  |  |
| $CaO/Al_2O_3$ | — | 11.21 | 11.21 |
| $Al_2O_3/Fe_2O_3$ | — | 2.42 | 10.92 |
| $SO_3/(Al_2O_3 + Fe_2O_3)$ | — | 2.30 | 2.98 |
| $SO_3/SiO_2$ | 0.67 | 0.72 | 0.72 |
| $CaO/SO_3$ | 3.50 | 3.45 | 3.45 |
| $CaO/SiO_2$ | 2.33 | 2.50 | 2.50 |
| $MgO/SiO_2$ | 0.00 | 0.10 | 0.03 |

TABLE 5

Mixtures of a commercial calcium sulfoaluminate cement with clinkers according to Examples 1 to 3

| Mixture | CSA | $T_{pur}$ | $TK_{FA}$ | $TK_{AGS}$ | MicroA |
|---|---|---|---|---|---|
| CSA-C$ | 85% |  |  |  | 15% |
| CSA-T | 60% | 40% |  |  |  |
| CSA-T-C$ | 68% | 20% |  |  | 12% |
| CSA-TK_FA-C$ | 68% |  | 20% |  | 12% |
| CSA-TK_AGS-C$ | 68% |  |  | 20% | 12% |

TABLE 6

Chemical composition of the commercial calcium sulfoaluminate cement used

|  |  | China CSA |
|---|---|---|
| GV 1050° C. | % | 0.18 |
| $SiO_2$ | % | 6.93 |
| $Al_2O_3$ | % | 36.48 |
| $TiO_2$ | % | 1.64 |
| MnO | % | 0.00 |
| $Fe_2O_3$ | % | 2.24 |
| CaO | % | 40.61 |
| MgO | % | 2.94 |
| $K_2O$ | % | 0.18 |
| $Na_2O$ | % | 0.00 |
| $SO_3$ | % | 8.61 |
| $P_2O_5$ | % | 0.14 |
| Total | % | 99.94 |

TABLE 7

Mineralogy of the cements and hardened cement pastes from Example 4

|  | 0 days | 7 days |
|---|---|---|
| CSA-C$ |  |  |
| Ye'elimite | 33.8% | 0.8% |
| Anhydrite | 8.8% | 2.0% |
| Belite (total) | 8.1% | 8.0% |
| $C_3A$ cub | 1.3% | 1.0% |
| $C_4AF$ | 1.3% | 0.5% |
| Ettringite | 0.0% | 29.7% |
| Stratlingite | 0.0% | 2.2% |
| Traces | 5.6% | 7.0% |
| Amorphous | 0.0% | 41.6% |
| Water | 41.2% | 7.1% |

TABLE 7-continued

Mineralogy of the cements and hardened
cement pastes from Example 4

|  | 0 days | 7 days |
|---|---|---|
| CSA-T-C$ | | |
| Ye'elimite | 27.0% | 0.8% |
| Anhydrite | 7.1% | 1.8% |
| Belite (total) | 6.4% | 6.4% |
| $C_3A$ cub | 1.0% | 0.9% |
| $C_4AF$ | 1.0% | 0.5% |
| Ternesite ($C_5S_2$$) | 11.8% | 10.1% |
| Ettringite | 0.0% | 25.8% |
| Stratlingite | 0.0% | 2.1% |
| Traces | 4.5% | 6.4% |
| Amorphous | 0.0% | 35.0% |
| Water | 41.2% | 10.2% |
| CSA-TK__AGS-C$ | | |
| Ye'elimite | 27.8% | 0.4% |
| Anhydrite | 7.1% | 1.5% |
| Belite (total) | 7.0% | 7.2% |
| $C_3A$ cub | 1.0% | 0.8% |
| $C_4AF$ | 1.0% | 0.4% |
| Ternesite ($C_5S_2$$) | 10.1% | 8.1% |
| Ettringite | 0.0% | 23.5% |
| Stratlingite | 0.0% | 2.2% |
| Traces | 4.7% | 5.3% |
| Amorphous | 0.0% | 39.5% |
| Water | 41.2% | 11.2% |
| CSA-T | | |
| Ye'elimite | 23.8% | 0.0% |
| Belite (total) | 5.7% | 5.6% |
| $C_3A$ cub | 0.9% | 0.4% |
| $C_4AF$ | 0.9% | 0.6% |
| Ternesite ($C_5S_2$$) | 23.5% | 20.3% |
| Ettringite | 0.0% | 10.8% |
| Stratlingite | 0.0% | 2.4% |
| Traces | 4.0% | 10.4% |
| Amorphous | 0.0% | 33.7% |
| Water | 41.2% | 15.8% |
| CSA-TK__FA-C$ | | |
| Ye'elimite | 28.1% | 0.4% |
| Anhydrite | 7.1% | 1.0% |
| Belite (total) | 7.6% | 7.7% |
| $C_3A$ cub | 1.4% | 1.3% |
| $C_4AF$ | 1.0% | 0.8% |
| Ternesite ($C_5S_2$$) | 8.8% | 5.5% |
| Ettringite | 0.0% | 25.1% |
| Stratlingite | 0.0% | 2.4% |
| Traces | 4.8% | 6.5% |
| Amorphous | 0.0% | 39.1% |
| Water | 41.2% | 10.3% |

Example 5

A stoichiometric mixture of $CaCO_3$ [Merck, analytical grade], $CaSO_4$ [Merck, analytical grade], quartz powder [Merck, analytical grade] with and without 0.1 mole % $Ca_3P_2O_8$, at a constant $CaO$—$SiO_2$ ratio, was burned for 1 hour at various temperatures and using various heating rates (30 minute heating from 20° C. to target temperature vs. direct addition of the raw meal at the target temperature), then rapidly cooled, ground, and again burned for 1 hour at the target temperature and rapidly cooled. This produced ternesite clinkers in various qualities. FIGS. 5 and 6 each show the $C_5S_2$$ (■), $\alpha C_2S$ (◇), $\beta C_2S$ (▲) and free lime (●) quantities depending on the maximum temperature during sintering. The black values were obtained during the normal heating rate of approximately 40° C./minute and the gray values at a high heating rate of approximately 4000° C./minute.

It was found that the addition of mineralizers as well as a high heating rate accelerate/favor the clinker phase formation (lower contents of free lime), and cause the formation of reactive $\alpha$ $C_2S$ polymorphs, the stabilization of $C_5S_2$$ at higher temperatures (>1200° C., refer to FIGS. 5 and 6) and the formation of an X-ray amorphous phase.

Example 6

A ternesite clinker according to Example 1 was ground to two degrees of fineness. FIG. 7 shows the heat flow and cumulative heat flow of the ground ternesite during mixing with water using a w/b 0.5

It was discovered that increasing the fineness significantly increases the reactivity of the $C_5S_2$$ phase (see FIG. 7).

The invention claimed is:

1. A method for producing a ternesite clinker, comprising sintering a raw meal mixture, which contains at least sources for CaO, $SiO_2$, and $SO_3$, wherein a temperature during sintering is adjusted in the range of 900 to 1300° C. such that the ternesite clinker has a content of $C_5S_2$$ ranging from 20 to 95% by weight and a content of $C_4(A_xF_{(1-x)})_3$$, with x being 0.1 to 1, of less than 15% by weight, in each case relative to the total weight of the clinker.

2. The method according to claim 1, wherein the raw meal mixture additionally contains sources for $Al_2O_3$ and $Fe_2O_3$.

3. The method according to claim 1, further comprising stabilizing the $C_5S_2$$ by adding one or more foreign ions selected from the group consisting of halogens, nonmetals, alkali and alkaline earth metals, substances from the transition metals and metalloids, and metals to crystal structure of $C_5S_2$$.

4. The method according to claim 1, further comprising adding a material that supplies mineralizers to the raw meal.

5. The method according to claim 1, further comprising setting a heating rate in the range of 10 to 6000° C./minute.

6. The method according to claim 3, wherein the temperature during sintering ranges between 1100 and 1300° C.

7. The method according to claim 1, wherein the temperature during sintering ranges from 900 to 1200° C.

8. The method according to claim 1, wherein, in addition to $C_5S_2$$ and $C_4(A_xF_{(1-x)})_3$$, the clinker contains 0 to 30% by weight $C_2(A_yF_{(1-y)})$, with y ranging from 0.2 to 0.8, 0 to 20% by weight reactive aluminates, 0 to 25% by weight periclase (M), and 0 to 30% by weight secondary phases, relative to the total amount of clinker.

9. The method according to claim 8, wherein at least one X-ray amorphous phase or a glassy phase is present as a secondary phase in the range of 1 to 10% by weight.

10. The method according to claim 1, wherein the ternesite clinker is ground to a degree of fineness (according to Blaine) ranging from 2000 $cm^2/g$ to 6000 $cm^2/g$.

11. The method according to claim 1, wherein the ternesite clinker is ground to a degree of fineness (according to Blaine) ranging from 5000 to 10000 $cm^2/g$.

12. The method according to claim 1, wherein the ternesite clinker is ground to a degree of fineness (according to Blaine) of more than 10000 $cm^2/g$, and 3 to 99% of a phase content of the clinker is present as an X-ray amorphous phase.

13. The method according to claim 4, wherein the material is selected from the group consisting of phosphate, fluoride, alkali, nitrate, chloride, and mixtures thereof.

14. The method according to claim 1, wherein the temperature during sintering ranges from 1050 to 1150° C.

15. The method according to claim 9, wherein the X-ray amorphous phase or glassy phase is present in the range from 2 to 8% by weight.

16. The method according to claim 15, wherein the X-ray amorphous phase or glassy phase is present in the range from 3 to 5% by weight.

17. The method according to claim 10, wherein the degree of fineness ranges from 3000 cm$^2$/g to 5000 cm$^2$/g.

18. The method according to claim 11, wherein the degree of fineness ranges from 7000 cm$^2$/g to 9000 cm$^2$/g.

19. The method according to according to claim 12, wherein 5 to 50% of the phase content of the clinker is present as an X-ray amorphous phase.

20. The method according to claim 3, wherein the temperature during sintering ranges from 1050 to 1150° C.

21. The method according to according to claim 9, wherein the ternesite clinker is ground to a degree of fineness (according to Blaine) ranging from 5000 to 10000 cm$^2$/g.

* * * * *